Jan. 11, 1955

H. P. BIRKEMEIER 2,699,259

FILTER MOVABLE TO BY-PASS POSITION

Filed May 15, 1952

Inventor.
Henry P. Birkemeier.
By John W Darley
Attorney.

2,699,259
Patented Jan. 11, 1955

2,699,259
FILTER MOVABLE TO BY-PASS POSITION

Henry P. Birkemeier, Chicago, Ill., assignor to Bell & Gossett Company, Morton Grove, Ill., a corporation of Illinois Application May 15, 1952, Serial No. 287,967

3 Claims. (Cl. 210—164)

My invention relates to yieldable screens and more particularly to a device that may be removably inserted in a pipe, conduit or other fitting for screening foreign particles from a fluid flowing therethrough.

In many installations including pipe systems and one or more valves which are opened and closed under determined conditions to control a fluid passing through the systems, sediment, scale or other foreign particles entrained in the fluid occasionally become lodged in the valve seats and prevent full closure of the valve. This condition is particularly annoying in a closed hot water heating system having a pressure relief valve. If after opening to relieve a predetermined system pressure, the valve is prevented from reseating by such particles, the system will constantly leak water through the valve which is objectionable.

It is therefore one object of the invention to provide a screen on the inlet side of a pipe system valve or generally in any conduit for trapping entrained particles from the fluid passing therethrough and which is arranged to yield and permit flow through the conduit if the screen becomes clogged by the particles.

A further object is to provide a screen of the character indicated which is guided in its yielding movement to prevent cocking and stoppage of flow when clogged and which is arranged for easy removal from the associated fitting to permit cleaning.

These and further objects of the invention will be set forth in the following specification, reference being had to the accompanying drawing, and the novel means by which said objects are effectuated will be definitely pointed out in the claims.

This application is a continuation-in-part of my application for Pressure Relief Valve which matured into U. S. Letters Patent No. 2,603,231, dated July 15, 1952.

Figure 1:
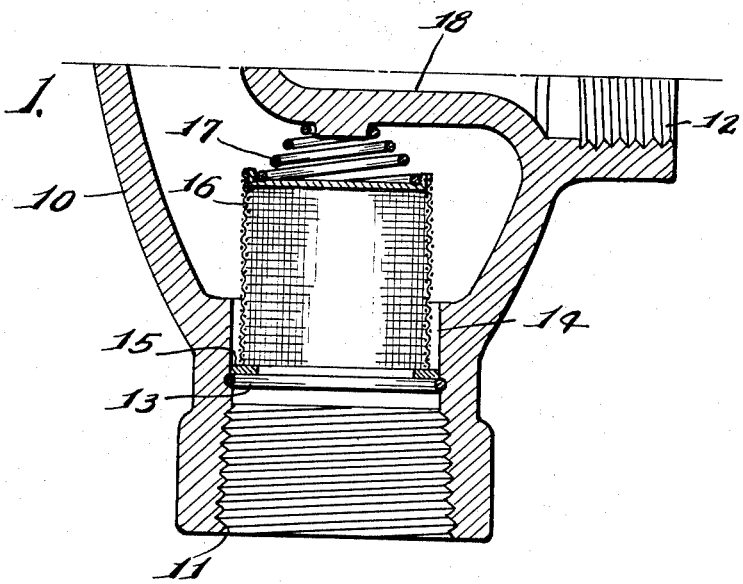
Fig. 1 is a sectional elevation of one form of the yieldable screen as applied to the body of a pressure relief valve.

Referring to Fig. 1 of the drawing, the numeral 10 designates a valve body having inlet and outlet passages 11 and 12, respectively, which may be threaded to receive lengths of pipe. A split, spring ring 13 is recessed in a smooth portion 14 of the inlet passage 11 and resting on the ring is a washer 15 that fits the portion 14. An inverted screen cup 16 rests on the washer 15 and is normally maintained in this position by a spring 17 interposed between the end of the cup and a wall 18. The wall 18 is disposed between the passages 11 and 12 and provides the usual septum in a relief valve, for example, that carries the valve seat.

Under normal conditions, the screen cup collects any foreign matter entrained in the flowing liquid, but, if after a long period of use, the cup should become clogged so as to prevent flow, the system pressure lifts the cup against the spring 17 so that the flow will continue. An indication of such a condition in a pressure relief valve would be a constant leak on the exhaust side of the valve at pressures below the setting of the valve. The pipe connection to the passage 11 is then broken and the screen cup is withdrawn axially through the passage 11 for cleaning after first removing the split ring 13. In the case of a pressure relief valve, this accessibility is an important feature of the invention because it is unnecessary to disassemble the body and cover of the valve.

Figure 2:
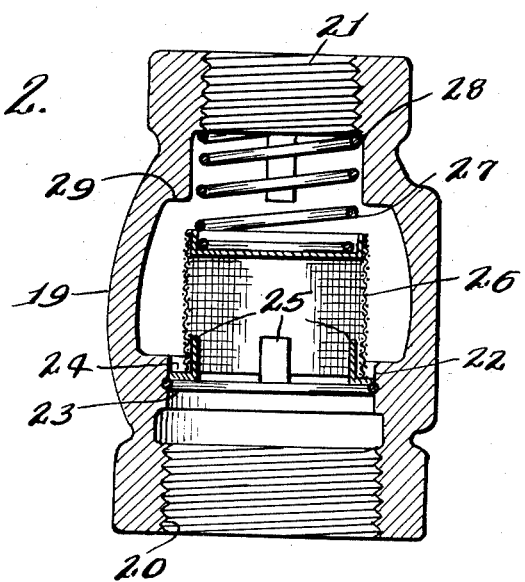
Fig. 2 is a sectional elevation of a modified arrangement showing the screen mounted in a fitting that may be interposed in any pipe line.

In Fig. 2 is illustrated a modification wherein the screen cup is associated with a special fitting that may be interposed in any pipe line. It comprises a pipe fitting 19 having inlet and outlet passages 20 and 21, respectively, that are threaded for attachment to lengths of pipe. A smooth portion 22 of the passage 20 is recessed to receive a split, spring ring 23 on which is seated a washer 24 from whose inner periphery extends upwardly, or in the direction of fluid flow, a plurality of circumferentially spaced fingers 25. An inverted screen cup 26 has its lower annular edge resting on the washer 24 outwardly of the fingers 25 and is normally maintained in this position by a spring 27 interposed between the depressed top of the cup and an interior shoulder 28 at the inner end of the passage 21.

This modification operates similarly to that shown in Fig. 1, the screen cup functioning in its intended manner so long as it is not clogged. When the latter happens, the cup is moved from its seat against the spring 27 to permit continued flow and is guided during such movement by the fingers 25. A plurality of shoulders 29 is spaced around the interior of the fitting 19 to limit the extent of movement of the cup 26 when clogged, the upper end of the cup contacting the shoulders 29 and the lower end of the cup being retained in guided relation to the fingers 25. To clean the screen cup, it is merely necessary to break the pipe connection and withdraw in succession, the split ring 23, washer 24 and cup 26 through the inlet passage 20.

I claim:

1. The combination of a fitting having an inlet passage including an annular recess and an internal shoulder spaced therefrom, a split, spring ring seated in the recess, a washer seated on the ring and having a plurality of fingers extending from the inner periphery of the washer in the direction of flow through the fitting, a screen cup surrounding the fingers in guidable relation thereto and with its open, annular edge resting on the washer, and a spring interposed between the shoulder and the closed end of the cup for normally maintaining the latter in contact with the washer.

2. The combination of a fitting having an inlet passage including an annular recess, a spring ring seated in the recess, a washer seated on the ring with its inward portion extending transversely and partially into the passage and having a plurality of fingers extending from the inner periphery of the washer in the direction of flow through the fitting, a screen cup surrounding the fingers in guidable relation thereto and with its open, annular edge resting on the washer, and a spring interposed between a part of the fitting and the closed end of the cup for normally maintaining the cup in contact with the washer.

3. The combination of a fitting having an inlet passage including an annular recess and shoulder means spaced therefrom, a spring ring seated in the recess, a washer seated on the ring with its inward portion extending transversely and partially into the passage and having a plurality of fingers extending from the inner periphery of the washer in the direction of flow through the fitting, a screen cup surrounding the fingers in guidable relation thereto and with its open, annular edge resting on the washer, and a spring interposed between a part of the fitting and the closed end of the cup for normally maintaining said cup edge in contact with the washer and with the closed end of the cup spaced from the shoulder means a distance less than the length of the fingers.

References Cited in the file of this patent

UNITED STATES PATENTS

| | | |
|---|---|---|
| 1,696,366 | Smith | Dec. 25, 1928 |
| 2,145,535 | Vokes | Jan. 31, 1939 |
| 2,220,706 | Cantin | Nov. 5, 1940 |
| 2,275,750 | Genetti et al. | Mar. 10, 1942 |
| 2,563,786 | James | Aug. 7, 1951 |

FOREIGN PATENTS

| | | |
|---|---|---|
| 294,706 | Great Britain | Aug. 2, 1928 |
| 874,230 | France | July 31, 1942 |